United States Patent [19]

Diller

[11] Patent Number: 5,714,109
[45] Date of Patent: Feb. 3, 1998

[54] METHOD AND APPARATUS FOR SUPPLYING CONDITIONED AIR TO A BLOW-MOLDING OVEN

[75] Inventor: Robert L. Diller, Jacobus, Pa.

[73] Assignee: Graham Packaging Corporation, York, Pa.

[21] Appl. No.: 631,533

[22] Filed: Apr. 12, 1996

[51] Int. Cl.[6] ..................................... B29C 49/68
[52] U.S. Cl. .................. 264/454; 264/40.6; 264/458; 425/526; 432/10
[58] Field of Search ................... 264/40.6, 535, 264/454, 458, 532, 525; 425/526; 432/5, 10

[56] References Cited

U.S. PATENT DOCUMENTS

| | | | |
|---|---|---|---|
| 3,930,779 | 1/1976 | Farrell | 425/526 |
| 3,937,609 | 2/1976 | Ryder | 425/526 |
| 4,076,071 | 2/1978 | Rosenkranz et al. . | |
| 4,091,059 | 5/1978 | Ryder . | |
| 4,147,487 | 4/1979 | Dickson et al. . | |
| 4,224,263 | 9/1980 | Kontz . | |
| 4,373,891 | 2/1983 | Kishida et al. . | |
| 4,572,811 | 2/1986 | Ota et al. . | |
| 4,836,971 | 6/1989 | Denis et al. . | |
| 4,880,581 | 11/1989 | Dastoli et al. | 264/525 |
| 5,322,651 | 6/1994 | Emmer . | |
| 5,326,258 | 7/1994 | Gittner et al. | 432/5 |
| 5,342,558 | 8/1994 | Denis et al. . | |
| 5,400,607 | 3/1995 | Cayce | 62/90 |
| 5,419,866 | 5/1995 | Valyi . | |
| 5,445,515 | 8/1995 | Orimoto et al. . | |

Primary Examiner—Catherine Timm
Attorney, Agent, or Firm—Howson and Howson

[57] ABSTRACT

A method and apparatus which allows blow-molded plastic containers to be manufactured at high rates of production independent of ambient environmental conditions. The method and apparatus eliminate the need to make adjustments to blow-molding oven operating parameters when environmental conditions change and reduce defects such as caused by water spots. The method includes the steps of flowing ambient air over cooling coils to remove moisture, heating the air to a constant pre-determined temperature and delivering the conditioned air to the blow-molding oven. The apparatus includes a variable speed blower which forces ambient air at a predetermined volumetric flow rate over cooling coils and an electric heater to provide the blow molding oven with a constant volumetric flow rate of constant temperature and low humidity air.

18 Claims, 3 Drawing Sheets

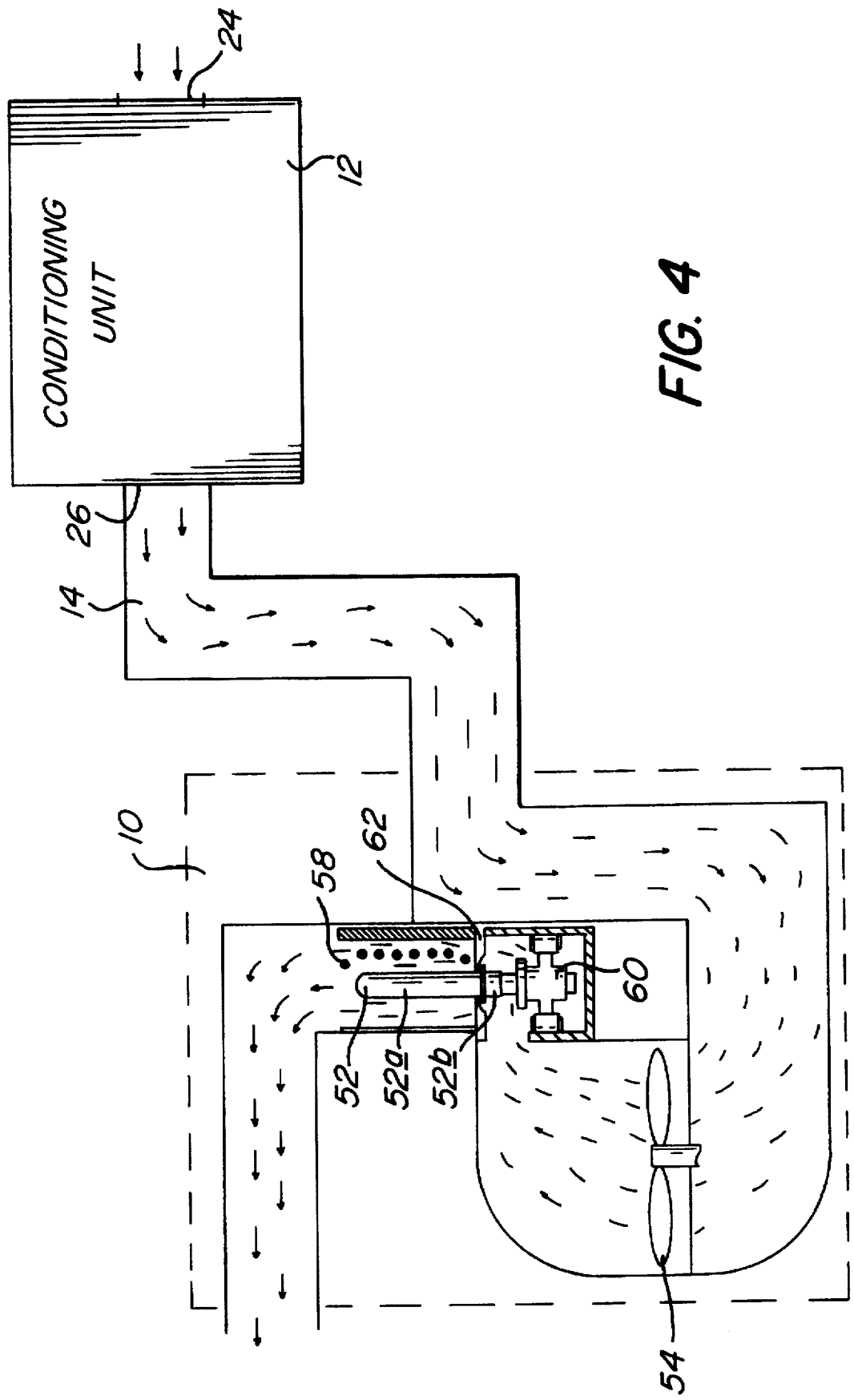

METHOD AND APPARATUS FOR SUPPLYING CONDITIONED AIR TO A BLOW-MOLDING OVEN

FIELD OF THE INVENTION

The present invention relates to the efficient and high speed manufacture of plastic blow-molded containers, and more particularly to a method and apparatus for supplying conditioned air to a blow-molding oven such that the air is supplied at a desirable volume, a constant temperature and a low humidity to enable consistent processing.

BACKGROUND OF THE INVENTION

Blow-molded plastic containers are commonly used as packaging for a variety of products, such as juices. The process for their manufacture inherently requires the intake of ambient air by the blow-molding oven and machinery. The ambient air is applied to either a preform, a semi-blown container, or both, in a step, or steps, in the manufacturing process. An example of such a process is disclosed in U.S. Pat. No. 5,322,651 issued to Emmer. Preforms are initially heated in a blow-molding oven, and are then indexed into blow-molding machinery where they may be stretched and/or blown. Such a process may produce up to 250 bottles per minute when operating at full speed, depending on the type and size of blow-molding machinery.

A problem with known processes utilizing blow-molding ovens is that under certain environmental conditions, the ambient air conditions can cause a slowdown of the process and a reduction in the quality of the goods produced for a variety of reasons.

Blow molding ovens are designed to permit adjustment to effect efficient usage. For instance, as ambient temperature and humidity levels of the air change throughout the day, adjustments can be made to the heating elements in the ovens to maintain efficient processing. However, when the ambient temperature rises above a certain level, for instance, 85° F. at 50% relative humidity, the ovens cannot provide the required thermal environment for the preforms at full speed production. Such conditions are commonly experienced in plants having hot and humid ambient air environments. Therefore, the only recourse at these plants when experiencing these ambient conditions is to slow the pace of production.

Another problem is that adjustments to blow-molding ovens must be made frequently throughout the course of the day. This requires constant monitoring of the machinery and environmental conditions by a worker, since temperature and humidity may frequently rise and fall during a given day. In addition, the adjustments are largely accomplished by trial and error methods which sometimes result in defective products being produced for a period of time until proper adjustments are made.

A further problem relates to wind drafts which are experienced within the confines of the manufacturing plant. Such drafts can be created by the opening of doors or windows within the plant. The drafts affect the temperature, rate and direction of air drawn into the blow molding oven and can have an effect on the process parameters to cause the production of defective containers. Often, at such plants, doors are required to be maintained in a closed position during blow-molding to prevent such problems. However, such precautions are not always effective in completely eliminating the problems caused by drafts.

A still further problem relates to the moisture contained in the ambient air. While blow-molding ovens heat the body portion of a preform, the finish of the preform must not be subjected to heat; otherwise, the finish would become deformed. For this reason, the finish of a preform is insulated from the heat by a cooling device. However, moist ambient air flowing past the finish cooling device produces condensation. As the condensation collects under and adjacent to the path of the preforms within the blow-molding oven, drops of water are often lifted by swirling air and deposited onto the preforms. The water drops create spots on the preforms, resulting in the production of defective, non-useable containers.

A still further problem is created by the presence of dust and like airborne material which float in the ambient air. Such material is drawn into the blow-molding oven and can coat the preforms and internal components of the blow-molding oven.

Manufacturers of blow-molding machinery have made attempts to address the above referenced problems with their ovens, but none has satisfactorily solved the problem. For instance, the aforementioned patent to Emmer utilizes a system which automatically controls the temperature of air drawn into a blow-molding oven by mixing ambient air with recycled air. However, if the process demands a circulation of air at, for instance, 80° F. and the temperature of the ambient air rises near or above 80° F., then the process will not be able to produce satisfactory containers since the temperature of the circulating air will not be able to be maintained at the required 80° F. Therefore, the heating elements must be adjusted to a lower temperature, and the pace at which the preform travels through the blow-molding oven must be slowed. In addition, the system disclosed in Emmer does not address the problems created by moisture and dust in the air, or the problems created by wind drafts within the manufacturing facility.

Although the referenced Emmer system provides a blow-molding oven which can be used effectively in some ambient plant environments at high speeds, there is a need for an improved method and apparatus which allows blow-molding operation independent of ambient environmental conditions. The improvement should be useable with existing ovens, should be capable of ready installation, and should be easy to operate.

OBJECTS OF THE INVENTION

With the foregoing in mind, a primary object of the present invention is to provide a method of manufacturing blow-molded, plastic containers at high rates of speed independent of ambient environmental conditions.

Another object of the present invention is to provide a method of manufacture which eliminates the need to continually monitor and adjust control parameters of blow-molding ovens during the course of the day due to changing environmental conditions.

A further object of the present invention is to provide an apparatus to deliver a desirable volume of constant temperature and low humidity air in a closed system to a blow-molding oven.

A still further object of the present invention is to provide a method and apparatus for supplying air to existing blow-molding ovens located in plants subject to hot and humid ambient air conditions, which prevents the collection of condensation and dust within the oven and which is unaffected by wind drafts in the plants.

SUMMARY OF THE INVENTION

More specifically, in one aspect, the present invention provides a method of manufacturing blow-molded plastic containers at high rates of production independent of ambient environmental conditions. The first step of the method comprises forcing air at a pre-determined flow-rate into a chamber which is connected and feeds into a blow-molding oven where preforms are heated. A preferred predetermined flow-rate is in a range of about 2,250 to 11,500 cubic feet per minute (c.f.m.) depending on oven type and size. Another step includes cooling the air to between about 42° to 48° F. as it flows through the chamber. The cooling causes moisture to be removed from the air so that the relative humidity in the air is reduced to between about 40 to 50 percent. The next step is to heat the air after the cooling step to increase the temperature of the air to between about 83° to 88° F. which is then fed into the blow-molding oven. The method provides a desirable volume of constant temperature and low humidity air to the blow-molding oven.

In another aspect, the present invention provides an apparatus for supplying air to a blow-molding oven which is used in the manufacture of blow-molded plastic containers. The apparatus comprises a variable-speed blower, or damper, for forcing a pre-determined volume of air into the blow-molding oven. Before the air enters the blow-molding oven, it is first cooled and dehumidified by a cooling unit and then heated to a constant pre-determined temperature by a heating unit located downstream from the cooling unit. A controller is used to regulate the constant pre-determined temperature of the air with a temperature measuring device located downstream from the heating unit. The apparatus provides a constant volume of constant temperature and low humidity air to the blow-molding oven.

BRIEF DESCRIPTION OF THE DRAWINGS

The foregoing and other objects, features and advantages of the present invention should become apparent from the following description when taken in conjunction with the accompanying drawings, wherein:

FIG. 4 is a schematic diagram illustrating an air conditioning unit connected to a blow-molding oven.

DESCRIPTION OF THE PREFERRED EMBODIMENT

Figure 1:
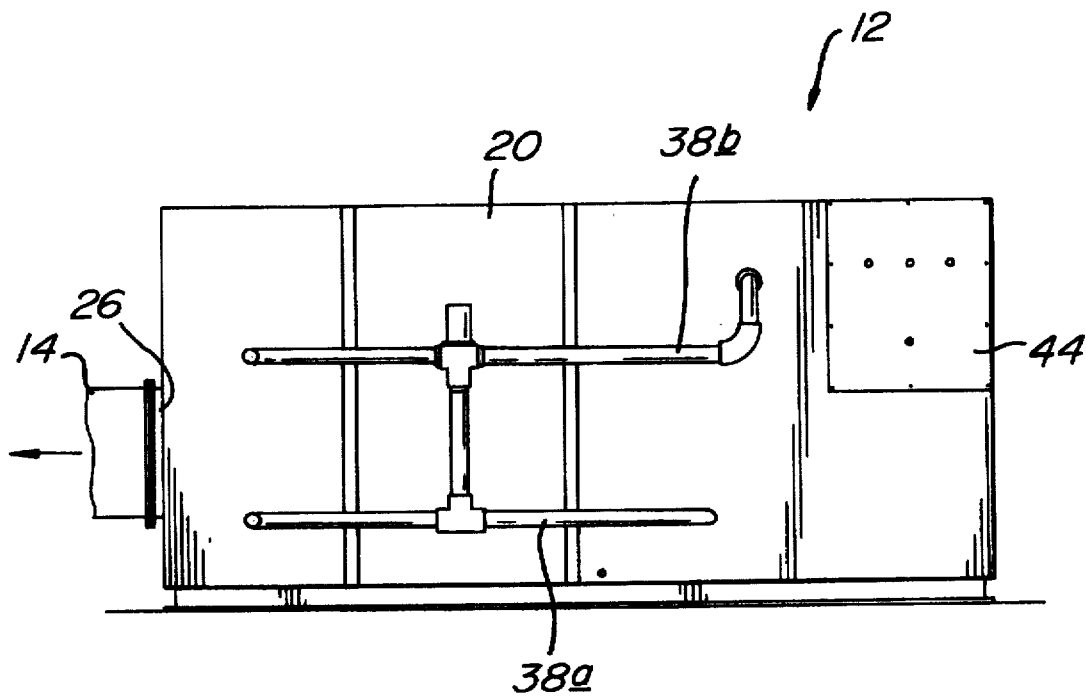
FIG. 1 is an elevational view of an air conditioning supply unit embodying the present invention.

FIG. 4 illustrates schematically a blow-molding oven 10 used to manufacture plastic containers. Inside the blow-molding oven 10, preforms 52, or parisons, are heated, and then transferred to blow-molding machines where they are stretched and/or blown into finished containers. Known manufacturing processes utilize any number of steps, or stations, to accomplish the above identified steps. For instance, a preform, a parison, a semi-blown container, or an over-blown container, may be indexed through an oven chamber for heat treatment.

As shown in FIG. 4, the oven 10 has a fan 54 for drawing in a volume of air at a pre-determined rate. The air is circulated past preforms 52 having a body portion 52a and a finish portion 52b. The body portions 52a are heated by a set of heating elements 58 as the preforms 52 travel through the oven 10 on a traveling support 60. The finish portion 52b is insulated from the heat by a set of cooling elements 62.

The predetermined path of the air through the oven 10 is illustrated in FIG. 4. The air is first directed at the open end of the finish portion 52b. The air then flows past the finish portion 52b and through a gap between the cooling elements 62 and the preform 52. The air then flows along the sides of the body portion 52a toward the closed end of the preform, and then, out of the blow molding oven. This flow path is particularly advantageous, since the flow of air prevents the heat, which emanates from the heating elements, from transferring through the gap and heating the finish portion 52b. Thus, the finish portion 52b is protected from heat induced damage.

Upon a call for air, the conventional blow-molding oven will cause a desirable volume of ambient air to be drawn into the blow-molding oven 10. However, depending on the temperature and humidity level of the ambient air at the manufacturing facility, the blow-molding oven 10 may not be able to provide, or maintain, the required thermal treatment within the prescribed time period. This results in defective containers which may not have the rigidity to maintain their required integrity during hot fill, transportation and handling. Since this result is not satisfactory, the rate of production is intentionally decreased to allow extra time for the blow-molding machines to compensate for the adverse effects of ambient environmental operational conditions.

As an example, a process not utilizing the present invention may produce 250 bottles per minute at maximum production speed. The process requires the heating elements 58 to radiate heat at 392° F., and for ambient air to circulate around the preforms 52. Best results are achieved if the ambient air is at a temperature of 85° F. However, the temperature of the ambient air may fluctuate throughout the day and frequent adjustments may be required to the temperature set point of the heating elements 58 and to the pace at which the preforms 52 pass through the oven 10. In addition, depending on the amount of moisture in the air, condensation will develop on cooling elements 62. The condensation may collect in the oven 10 and the circulating air may lift drops of water into contact with the preforms 52 and create water spots. Finally, dust and wind drafts are not prevented from entering the oven 10, both of which can cause further problems.

The present invention solves the above problems by initially conditioning the supply of ambient air outside of the blow-molding oven 10 before directing the air supply into the blow-molding oven 10. As illustrated in FIG. 4, a conditioning unit 12 is connected to the blow-molding oven 10 by a duct 14. The conditioning unit 12 intakes air at ambient temperatures and humidities and feeds the air to the blow-molding oven 10. The conditioning unit 12 conditions an appropriate volume of ambient air so that by the time the conditioned air is received by the blow-molding oven 10, the conditioned air is at a pre-determined constant temperature and humidity at which the blow-molding oven 10 operates most efficiently.

The conditioning unit 12 allows the blow-molding oven 10 to operate at its maximum rate of production. The use of the conditioning unit 12 eliminates the need to decrease the rate of production by as much as about 25 to 35% during hot and humid ambient air conditions, as was previously required. The conditioning unit 12 also eliminates the need to make operating parameter adjustments to the blow-molding oven due to changing temperatures, as was previously required. Thus, the conditioning unit 12 functions to maintain design blow-molding oven production rates under adverse temperature and humidity conditions.

Additionally, the conditioning unit 12 removes a significant amount of moisture from the ambient air so that condensation does not collect on or near the cooling elements 62 in the blow-molding oven 10. Thus, the conditioning unit 12 also functions to prevent container defects due to water spots created by drops of water lifted onto the preforms 52 in the oven 10 by the circulating air. The adverse effects of wind drafts and dust are also eliminated by use of the conditioning unit 12.

According to the method of the present invention, the first step is to initiate a pre-determined volumetric flow of ambient air into an intake opening 24 of the conditioning unit 12. The flow rate of the air should closely match that which is normally drawn into the blow-molding oven 10 by the fan 54 when it operates independent of the conditioning unit 12. This can be accomplished, for instance, with the use of a variable speed blower, or damper, which is located in the conditioning unit 12 and which is set automatically to mimic the fan 54 located in the blow-molding machine 10. Although various blow-molding machines require various volumetric flow rates, it has been determined through testing that creating a volumetric flow rate between about 2,250 to 11,500 c.f.m. is sufficient depending on the type and size of oven.

Once a flow of air has been established through the conditioning unit 12, into the duct 14, and then into the blow-molding oven 10, the next step according to the method of the present invention is to cool the air as it flows through the conditioning unit 12. This can be accomplished, for instance, by passing the air across chilled water coils located adjacent the ambient air intake 24. The extent of cooling may vary depending on ambient air temperatures and humidities; however, it was determined through testing that the temperature of the air should be decreased to about between 42° to 48° F.

Cooling the air results in lowering the moisture content of the air. Since warm air can retain higher levels of water vapor than cooler air, when hot air of high humidity is cooled, water vapor retained by the air is reduced. The cooler air, not being able to retain as much water vapor, releases the water vapor as condensation. Thus, the moisture content of the conditioned air as compared with the ambient air is reduced. It has been determined through testing that conventional blow-molding ovens operate most efficiently when the humidity level of the air is between 40 to 50% relative humidity.

After the ambient air is cooled and dehumidified, it continues to flow through the conditioning unit 12 and is heated. Heating of the dehumidified conditioned air to a constant pre-determined temperature allows the blow-molding oven 10 to receive a supply of air which it can readily use at maximum production speed in providing the thermal treatments required in preform, or parison, heating. The heating step in the conditioning unit 12 can be accomplished, for instance, by an electric heater, steam heat, hot water heat, or any heat source located downstream from the cooling apparatus. It has been found through testing that best results are achieved by heating the conditioned air to between about 83° to 88° F. before allowing the air to flow into the blow-molding machine 10.

The method according to the present invention can include other steps to aid in automation of the process. For example, the temperature of the conditioned air as it is discharged from the conditioning unit 12 can be measured to ensure precise control of air temperature. The temperature measurement information can be fed back to the heater controls to increase or decrease the amount of heating automatically so that the temperature is within a desired pre-set range. The volumetric flow rate and the relative humidity of the conditioned air can likewise be monitored to provide feedback to control operation of the conditioning unit 12.

In view of the foregoing, it should be apparent that the present invention now provides a method for allowing blow-molded plastic containers to be manufactured at high rates of production independent of ambient environmental conditions and without the need to constantly monitor and adjust blow-molding oven operating parameters in response to changing environmental conditions. In addition, production of containers having water spots is eliminated.

Figure 2:
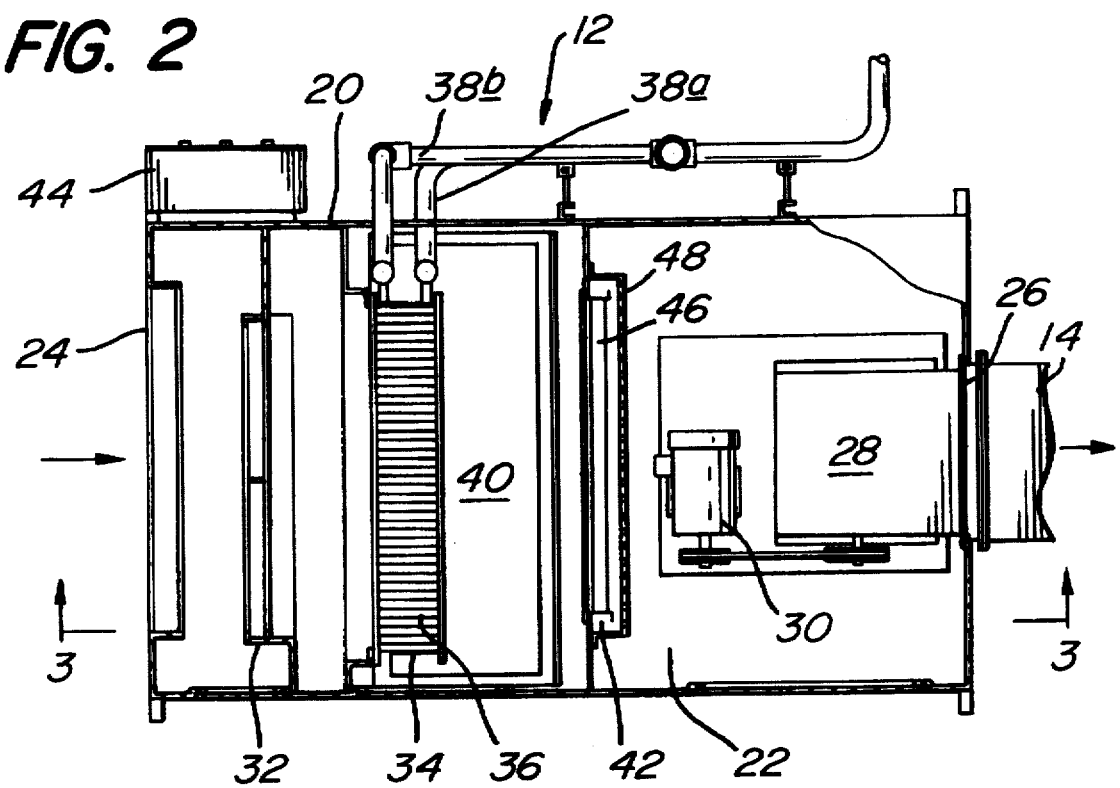
FIG. 2 is a sectional plan view of an air conditioning supply unit.
Figure 3:
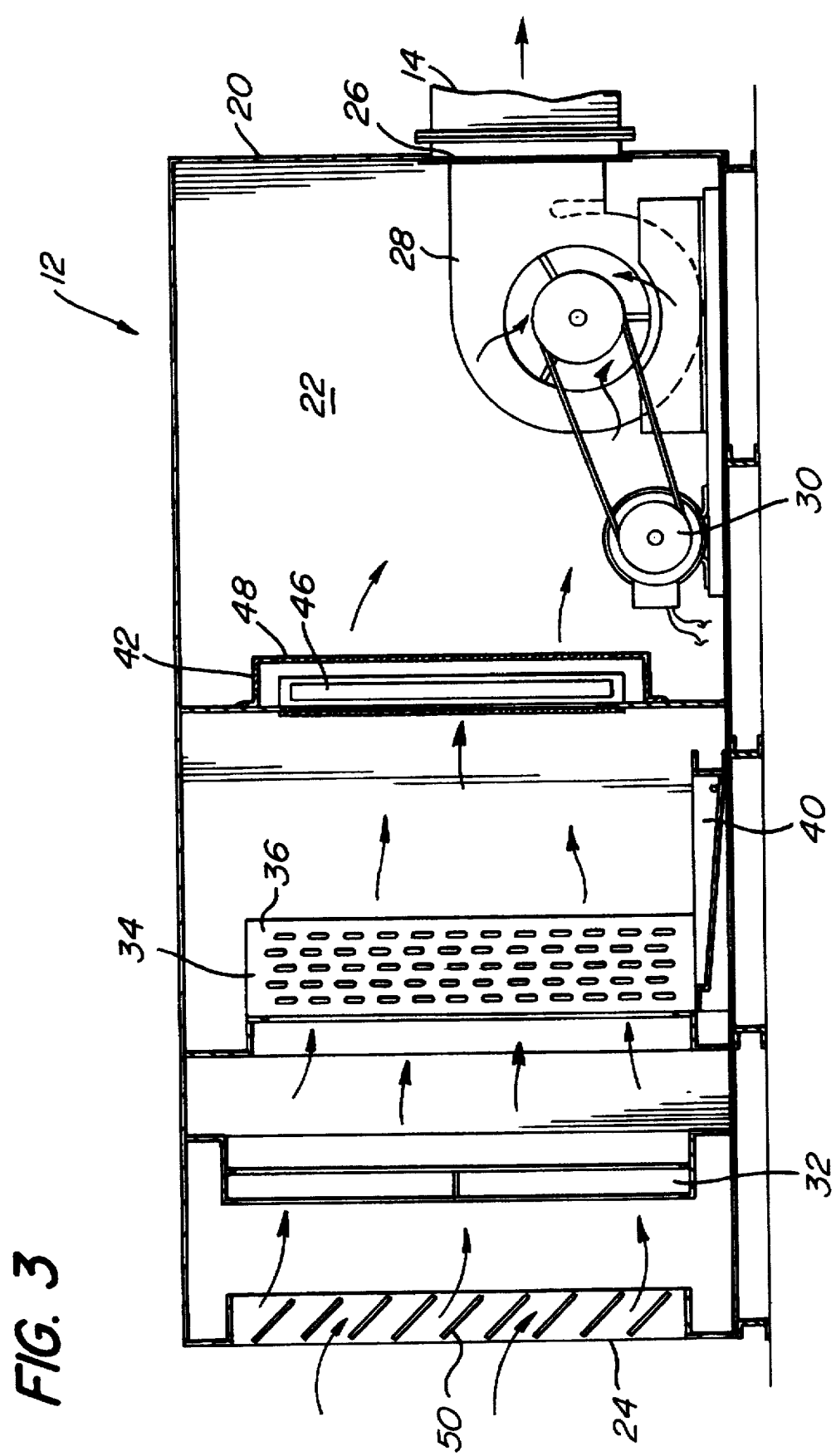
FIG. 3 is elevational cross-section view of the air conditioning unit illustrated in FIG. 2 along line 3—3.

Turning to another aspect of the present invention, an apparatus is provided which is particularly useful in performing the steps of the above described method. As illustrated in FIGS. 1–3, the conditioning unit 12 has a housing 20 defining a chamber 22 through which the air flows. The chamber 22 has an ambient air intake opening 24 and a conditioned air discharge port 26. The intake opening 24 has a series of louvers 50. The discharge port 26 connects to the duct 14 which defines a path for the air to flow to the blow-molding oven 10.

A blower 28 creates a flow of air into the intake opening 26 and out of the discharge port 26. As illustrated in the drawings, the blower 28 is located adjacent the discharge port 26 and is powered by a motor 30. The blower 28 and motor 30 can provide a range of volumetric flow rates so as to match the supply of air required by the blow-molding oven 10.

A filter 32 is located within the chamber 22 adjacent the intake opening 24 to prevent dust and the like from further passing through the conditioning unit 12 and into the blow-molding oven 10. The removal of dust further aids in reducing the production of defective containers, and thus, increases production rates.

A cooling unit 34 is located within the chamber 22 to cool and remove water vapor via condensation from the ambient air drawn into the chamber 22. As illustrated in the drawings, the cooling unit comprises a set of water chilled coils 36. A water chilled supply pipe 38a provides chilled water to the coils 36, while a chilled water return pipe 38b provides a path for the water out of the coils 36. A condensate collector plate 40 is located directly below coils 36 to provide a basin for the condensate dripping from the coils 36.

A heating unit 42 is located within the chamber 22 downstream from the cooling unit 34. After the ambient air is filtered, cooled and dehumidified, it is funneled through the heating unit 42 and heated to a pre-determined temperature. As illustrated in the drawings, the heating unit 42 is an electric heater 46 encased in a perforated heater shield 48; however, other types of heating apparatus can be utilized.

After the ambient air is filtered, cooled, dehumidified and heated within the chamber 22 it exists the chamber through the discharge port 26 into the duct 14 and then into the blow-molding oven 10. This closed system isolates the air circulating in the blow-molding oven 10 from wind drafts created in the manufacturing facility as by opening of doors and the like. The manufacturing process continues unaffected by the drafts or any temperature or humidity change created by the drafts. Thus, production is increased by the elimination of defects which would otherwise result from such drafts.

Parameters such as volumetric flow rate, maximum cooling temperature, minimum cooling temperature, relative humidity, maximum heating temperature and minimum heating temperature can be controlled by control box 44 located on the outside of the housing 20 of the conditioning unit 12. For instance, temperature measuring devices (not shown) such as thermocouples can be located at strategic locations within the chamber 22 to feedback information to the control box 44 which can then act to automatically adjust the blower 28, cooling unit 34 or heating unit 42 as required.

In view of the foregoing, it should be apparent that the present invention now provides a method and apparatus for allowing blow-molded plastic containers to be manufactured at high rates of production independent of ambient environmental conditions. Adjustments to blow-molding oven operating parameters in response to changing ambient air conditions are entirely eliminated along with the associated defects which such adjustments can cause. Other defects, such as those caused by water spots, dust or wind drafts are also eliminated. According to the present invention, existing blow-molding ovens can accommodate high rates of production, even in plants that normally experience extremely hot and humid ambient conditions.

Prior to the present invention, when a blow-molding oven having a design capacity of 10,000 bottles/hour was operated in a plant having ambient air at a temperature above 80° F. and relative humidity above 70%, it was necessary to reduce the blow molding speed by about 30%. After installation of the aforementioned apparatus operating in accordance with the method of the present invention, it became no longer necessary to reduce production speeds under the same air conditions, or to constantly monitor and adjust oven operating parameters. Accordingly, the present invention has solved perplexing problems and enabled as designed production rates to be maintained despite adverse ambient air conditions.

While a preferred embodiment of the present invention has been described in detail, various modifications, alterations, and changes may be made without departing from the spirit and the scope of the present invention as defined in the appended claims.

We claim:

1. A method of heat treating preforms used in manufacturing blow-molded plastic containers at a high rate of production independent of ambient environmental conditions, each of the preforms having an elongate tubular body portion forming a closed end and a threaded finish portion forming an open end, comprising the steps of:

applying heat with a heating element to the body portions of the preforms in a blow molding oven;

insulating with a cooling element the finish portions of the preforms from the heat applied by the heating element to the body portions of the preforms;

flowing ambient air at a pre-determined rate into a chamber located outside of the blow-molding oven;

removing moisture from the ambient air in said chamber to reduce the ambient air's relative humidity and to dehumidify the ambient air;

flowing the dehumidified air out of said chamber into the blow-molding oven while the entire body portions of the preforms are being heated by the heating element; and directing the flow of dehumidified air in the blow molding oven in a predetermined path beginning at the open end of the finish portion of the preform, leading between the preform and the cooling element, then along the elongate tubular body portion of the preform toward the closed end of the preform and finally out of the blow molding oven;

whereby a desirable volume of constant temperature and dehumidified air is provided to the blow-molding oven independent of ambient environmental conditions.

2. A method according to claim 1, wherein said moisture removing step is accomplished by cooling the air as it flows through said chamber to between about 42° to 48° F.

3. A method according to claim 2, wherein said cooling reduces the relative humidity of the air to between about 40 to 50%.

4. A method according to claim 1, further comprising the step of controlling said pre-determined flow rate to match a flow rate required by the blow-molding oven.

5. A method according to claim 4, wherein said predetermined flow rate is in a range of about 2,250 to 11,500 c.f.m.

6. A method according to claim 1, further comprising the step of heating the air in said chamber after said moisture removing step.

7. A method according to claim 6, wherein said heating step increases the temperature of the air to between about 83° to 88° F.

8. A method according to claim 6, further comprising the step of monitoring the temperature of the air downstream from said heating step.

9. A method according to claim 8, further comprising the step of controlling the heating step by feeding back the monitored temperature of the air downstream from said heating step.

10. A method according to claim 1, further comprising the step of filtering the air of dust as the air flows through said chamber.

11. A method of heat treating preforms used in manufacturing blow-molded plastic containers at a high rate of production independent of ambient environmental conditions, each of the preforms having an elongate tubular body portion forming a closed end and a threaded finish portion forming an open end, comprising the steps of:

applying heat with a heating element to the body portions of the preforms in a blow molding oven;

protecting the finish portions of the preforms from heat-induced damage while the body portions of the preforms are being heated by utilizing a cooling element to insulate the finish portions of the preforms from the heat emanating from the heating element;

flowing ambient air at a pre-determined rate into a chamber which is connected to the blow-molding oven while the entire body portions of the preforms are being heated;

controlling said pre-determined rate to match a rate required by the blow-molding oven;

cooling the ambient air as it flows through said chamber to reduce the moisture content of the ambient air to a relative humidity of below about 50% thereby dehumidifying the ambient air;

heating the dehumidified air in said chamber after said cooling step;

flowing the dehumidified air out of said chamber into the blow-molding oven after said heating step; and directing the flow of dehumidified air in the blow molding oven in a pre-determined path beginning at the open end of the finish portion of the preform, leading between the preform and the cooling element, then along the elongate tubular body portion of the preform toward the closed end of the preform and finally out of the blow molding oven;

whereby a desirable volume of constant temperature and dehumidified air is provided to the blow-molding oven independent of ambient environmental conditions.

12. A method according to claim 11, wherein said cooling step cools the air to between about 42° to 48° F.

13. A method according to claim 12, wherein said heating step increases the temperature of the air to between about 83° to 88° F.

14. A method according to claim 13, wherein said cooling step reduces the relative humidity of the air to between about 40 to 50%.

15. A method according to claim 14, wherein said predetermined rate is in a range of about 2,250 to 11,500 c.f.m.

16. A method according to claim 15, further comprising the step of filtering the air of dust as the air flows through said chamber.

17. A method according to claim 16, further comprising the step of monitoring the temperature of the air downstream from said heating step.

18. A method according to claim 17, further comprising the step of controlling the heating step by feeding back the monitored temperature of the air downstream from said heating step.

* * * * *

UNITED STATES PATENT AND TRADEMARK OFFICE
CERTIFICATE OF CORRECTION

PATENT NO.  : 5,714,109
DATED       : February 3, 1998
INVENTOR(S) : Robert L. Diller It is certified that error appears in the above-identified patent and that said Letters Patent is hereby corrected as shown below:

```
Column 6, line 53, "exists" should be changed to
--exits--.
```

Signed and Sealed this

Fifth Day of May, 1998

Attest:

BRUCE LEHMAN

Attesting Officer

Commissioner of Patents and Trademarks